United States Patent [19]

Thompson et al.

[11] Patent Number: 4,480,914
[45] Date of Patent: Nov. 6, 1984

[54] VIBRATION COMPENSATING INTERFEROMETER MIRROR DRIVE SYSTEM

[75] Inventors: Duane T. Thompson, Franklin; Edwin L. Karas, Sharon, both of Mass.; Ernest F. Root, Nashua, N.H.; Fredrik Schlyter, Fairfield, Conn.

[73] Assignee: The Foxboro Company, Foxboro, Mass.

[21] Appl. No.: 417,819

[22] Filed: Sep. 13, 1982

[51] Int. Cl.³ .................................................. G01B 9/02
[52] U.S. Cl. ...................................... 356/346; 356/352
[58] Field of Search ................. 356/346, 352; 318/640

[56] References Cited

U.S. PATENT DOCUMENTS

| | | | |
|---|---|---|---|
| 3,488,123 | 1/1970 | Nichols | 356/346 |
| 3,634,682 | 1/1972 | Gold | 318/640 X |
| 4,053,231 | 10/1977 | Fletcher et al. | 356/346 |
| 4,084,907 | 4/1978 | Pinard et al. | 356/346 |
| 4,149,118 | 4/1979 | Winterling et al. | 318/640 |
| 4,444,501 | 4/1984 | Schwiesow | 356/346 |

OTHER PUBLICATIONS

Kemp et al., "Rocket–Borne Cryogenic Interferometer Spectrometer used for an Artificial Auroral Measurement", *Proc. SPIE*, vol. 245, pp. 34–42, 1980.
"Interferometer Design and Data Handling in a High--Vibration Environment-Part I Interferometer Design", by R. P. Walker & J. D. Rex, in *SPIE*, vol. 191 (Multiplex and/or High-Throughput Spectroscopy) (1979), p. 88.
"Aspheric Surface Calibrator", by Ian Powell, in *Applied Optics*, vol. 20, No. 19, Oct. 1, 1981, p. 3367.

*Primary Examiner*—F. L. Evans
*Assistant Examiner*—Matthew W. Koren
*Attorney, Agent, or Firm*—Ronald J. Paglierani; Jack H. Wu; Terrence Martin

[57] ABSTRACT

An interferometer mirror drive system compensates for velocity and tilt errors induced by ambient vibration, as well as providing long-term automatic alignment of the mirrors. A uniquely configured λ/8-thick step on the fixed mirror of the interferometer introduces a 90-degree phase shift in one of two reference light beams, to produce quadrature signals which characterize the relative motion between the fixed and the driven mirrors. An electronic circuit extracts velocity and tilt data from the quadrature signals and develops error signals indicative of deviations from the desired coordinates of the moving mirror. The error signals are used to generate a set of control signals which in turn are supplied to an arrangement of drive coils attached to the moving mirror, to restore the mirror to the desired coordinates.

19 Claims, 14 Drawing Figures

VIBRATION COMPENSATING INTERFEROMETER MIRROR DRIVE SYSTEM

BACKGROUND OF THE INVENTION

The present invention relates in general to the field of scanning mirror interferometers, and in particular to a system for correcting vibration-induced errors in the movement of the scanning mirror.

Fourier Transform Infrared (FTIR) Spectrometers have achieved a widespread degree of popularity for the spectral analysis of chemical compositions. At the heart of the FTIR spectrometer is a Michelson Interferometer in which light from a broadband infrared source is split into two beams, to be reflected off a fixed mirror and a moving mirror respectively. The beams are recombined and irradiate an unknown sample, before impinging on a detector. The intensity of the recombined beam as a function of moving mirror position, which is made up of contributions of different wavelengths within the infrared source, is known as an interferogram. Performing a Fourier transform on the interferogram yields a spectrum identifying the infrared-absorbing constituents of the sample.

The accuracy of a continuous scan interferometer spectrometer is closely related to its ability to translate the moving mirror at a constant speed, and in a direction such that its reflecting surface remains normal to the light beam incident thereon. When used in a laboratory environment the instrument generally can be isolated effectively from external vibrations which otherwise would introduce fluctuations in the mirror speed and angular position. However, FTIR spectrometers are being used increasingly as airborne instrumentation, for example in space research, and also in on-line situations where they are coupled to a manufacturing process to insure consistent product quality. In these latter two situations, external vibrations are quite common, and so compensating schemes must be included within the spectrometer to negate the effects of the vibrations.

Several techniques have been used in the prior art to provide vibration compensation. One approach has been to sense the deviation in the tilt or the velocity of the moving mirror from predetermined settings by comparison with reference signals, and to compensate for the deviations, using either mechanical or mathematical techniques. In the mechanical compensation mode, error signals derived from the instantaneous moving mirror position are fed back through a servo system to one or more of a variety of mechanisms which readjusts the mirror tilt or velocity. In some cases, the compensation is applied directly to the main drive mechanism of the moving mirror, as shown in U.S. Pat. Nos. 3,488,123 and 4,149,118. In other cases auxiliary mechanisms, coupled to either the moving or the fixed mirror apply the necessary corrections, as disclosed in U.S. Pat. No. 3,809,481 and in "Fourier Spectroscopy Applied to Field Measurements," by G. W. Ashley and A. G. Tescher. Special Reports No. 114, Aspen International Conference on Fourier Spectroscopy, Jan. 5, 1971.

In the mathematical mode, electronic, or similar, circuitry subtracts the effects of mirror tilt or velocity deviations from the spectral information as it is being processed.

Another common approach is to use a rigid, precisely machined transport mechanism for the moving mirror which, due to its rigidity, does not permit the mirror to deviate significantly from its desired path, or from its desired speed. This approach may entail the use of lead screw or air bearing mechanisms coupled with a mirror-bearing carriage which rides along a precisely machined track, the close tolerances between the carriage and the track substantially eliminating fluctuations in mirror position. Nevertheless, an auxiliary servo mechanism, coupled with a feedback loop, usually is needed to adjust for mirror deviations. Examples of such hybrid systems are shown in U.S. Pat. No. 4,053,231 and in "Interferometer Design and Data Handling in a High-vibration Environment—Part I Interferometer Design" by R. P. Walker and J. D. Rex, SPIE Vol. 191 *Multiplex and/or High-Throughput Spectroscopy* (1979).

There have been deficiencies in these prior art attempts to solve the vibration problem. The precisely machined mirror transport mechanisms are generally quite expensive to manufacture, and are susceptible to wear, which erodes the accuracy of the interferometer. Therefore, continual attention and maintenance are required. On the other hand, the feedback schemes which correct for deviations from desired mirror tilt and velocity are often quite complex and expensive, and are limited as to the range of vibration frequencies to which they can respond. The deviations in mirror movement are usually sensed by observing fluctuations in the periodicity of the zero crossings of the interference fringes. However, since there is not a continuous observation of mirror position, but only at the two times per cycle when the interference fringes experience a zero crossing, the responses of such feedback schemes have been severely bandwidth-limited.

Also, a particular compensating mechanism typically corrects for either velocity or tilt, but not for both. Therefore multiple schemes are needed to adjust both parameters simultaneously.

Therefore, in light of the foregoing it is an object of the present invention to provide a simplified vibration-compensating mirror drive system which simultaneously controls both mirror tilt and velocity, and does so in a highly reliable, easily maintainable and relatively inexpensive fashion.

It is a further object of the invention to achieve improved bandwidth in a vibration-compensation scheme by a continuous derivation of mirror position and velocity data, so as to compensate for vibrations having a wide range of frequencies.

SUMMARY OF THE INVENTION

An embodiment of the present invention operates in the context of a mirror drive control system for an interferometer used for spectroscopic analysis, in which a first light beam derived from a monochromatic source impinges on a fixed mirror and a second light beam derived from the same monochromatic source impinges on a moving mirror. The moving mirror is supposed to be scanned at a constant rate and at a constant angular tilt relative to the direction of the light beam incident on its reflective surface. The first and second light beams are recombined at an optical detector after reflection from the respective mirrors. The embodiment further includes a drive mechanism which both moves the moving mirror and adjusts its angular tilt. There is also an element for deriving from the detected recombined light beams both a first set of error signals indicating deviations in the rate of movement of the moving mirror from the constant rate and a second set of error signals indicating deviations in the angular tilt of the moving mirror from the constant angular tilt. Finally, there is a servo system which receives the first and second sets of error signals and provides corresponding control signals to the drive mechanism to correct for the deviations from the constant rate and from the constant angular tilt.

In a particular embodiment of the invention, a uniquely configured step, having a thickness of λ/8 (λ being the wavelength of the monochromatic source) is located on the fixed mirror, and it introduces a 90-degree phase shift in portions of the light beam which reflect from the fixed mirror. The recombined beams are directed onto an optical detector array in which distinct segments of the array receive light from corresponding points on the fixed mirror, including the λ/8-thick step. Electronic circuitry associated with the system derives both velocity and tilt data by determining the fringe frequency of the detected light signals, and by analyzing the phase differences between the signals sensed by various combinations of detectors within the array.

Tilt and velocity error signals are generated and supplied via a servo system to a drive coil arrangement which suitably adjusts the moving mirror.

The moving mirror is supported on a flexible diaphragm which prevents the mirror from rotating about an axis perpendicular to its reflecting surface or from translating laterally, i.e., perpendicularly to its intended direction of motion. The control system maintains velocity and position of the mirror along the axis of intended motion and corrects for angular tilts outside of the plane normal to that axis.

DESCRIPTION OF THE PREFERRED EMBODIMENT

The illustrated embodiment of the present invention is described as being incorporated within a continuous-scanning Michelson Interferometer, forming a part of a Fourier Transform Infrared (FTIR) Spectrometer. However, it should not be interpreted that its use is restricted to such an application.

Figure 1:
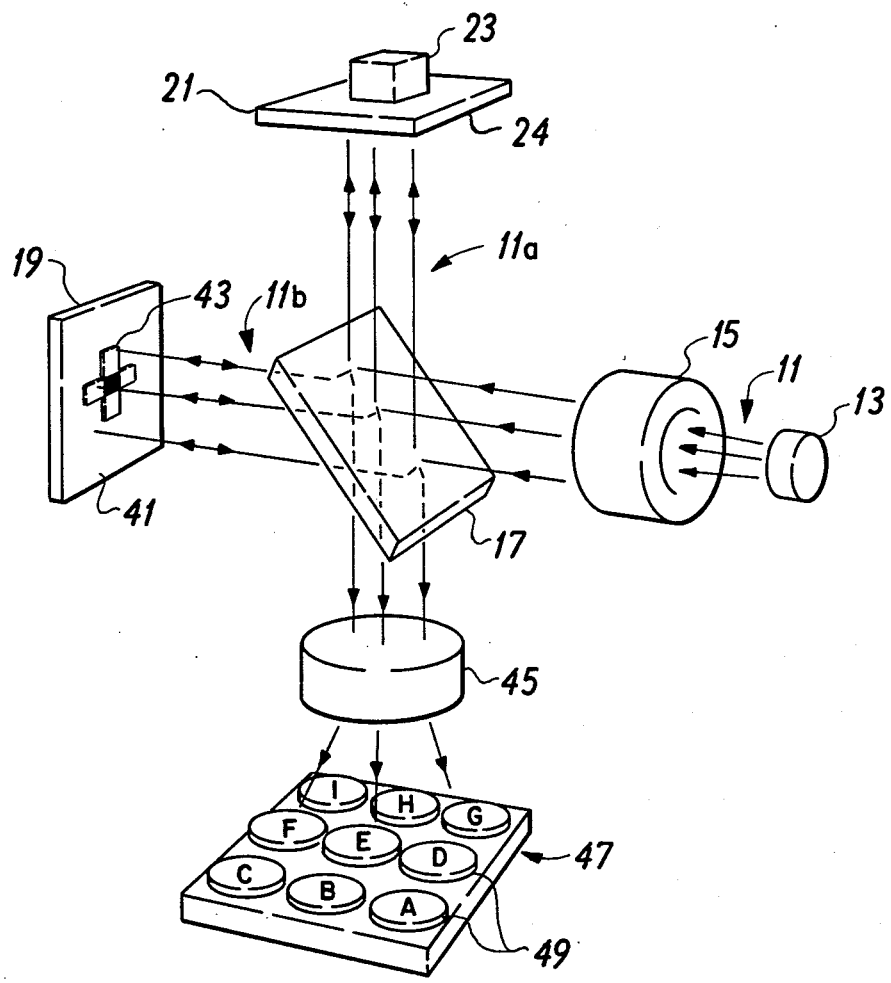
FIG. 1 is a schematic representation of an interferometer incorporating an embodiment of the present invention.

As shown in FIG. 1, a beam of light 11 from a monochromatic source 13, for example a helium-neon (He-Ne) laser, is collimated by an input optical element 15. The beam is incident on a beamsplitter/compensator combination 17 which divides the beam into two component beams 11a, 11b, traveling along two separate optical paths, a first path leading to a fixed mirror 19, and a second path leading to a moving mirror 21. Each of the component beams is incident on its respective mirror normal to its reflective surface. The moving mirror is connected to a support and drive mechanism indicated generally by reference numeral 23 which effects movement of the mirror, including a scanning motion over a limited range in a direction parallel to the direction of the incident beam 11a.

The unique support and drive mechanism 23, in conjunction with the continuous control exercised by a closed-loop servo system to be described hereinafter, provides automatic stable alignment of the moving mirror 21 with respect to the fixed mirror 19 as the moving mirror is scanned. Such control is needed because of the absence of a precise rigid mechanical structure for restricting the motion of the moving mirror to a predetermined path, as is found in most prior art interferometers. This combination also makes instantaneous adjustments to compensate for vibration-induced deviations from the desired tilt and velocity of the moving mirror.

Figure 14:
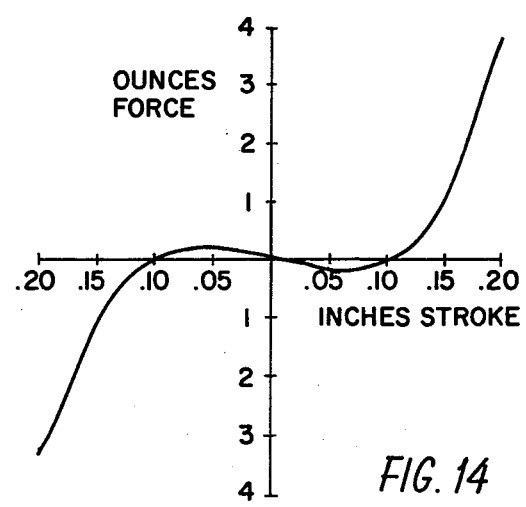
FIG. 14 is a curve showing the force vs stroke characteristic of the diaphragm of FIG. 3.
Figure 3:
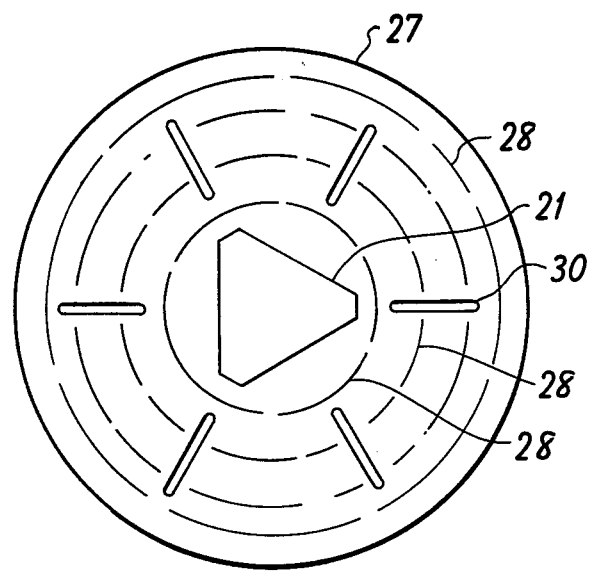
FIG. 3 is a detail view, taken along the line 3—3 of FIG. 2, of the mirror support diaphragm.

Referring now to FIG. 1, the moving mirror 21 is seated within a central aperture 25 of a thin corrugated metal diaphragm 27, and is firmly secured to the diaphragm by suitable means. The diaphragm, whose surface is contoured by a concentric series of circumferential convolutions 28, is clamped tightly to interferometer chassis 29. The diaphragm allows the mirror to be both driven in the desired scanning direction and tilted with minimal resistance. In effect, the mirror floats on the diaphragm suspension. However, the diaphragm also must provide sufficient resistance to undesired rotation and lateral movement of the mirror. To achieve these conflicting goals, the diaphragm has six radial apertures 30 (see FIG. 3) evenly spaced about its surface. These apertures enhance the diaphragm's flexibility, or compliance, in the axial direction by a factor of about 20, while retaining adequate lateral stiffness. Additionally the outermost convolution 28a is partially flattened after conventional "hardening" of the diaphragm, so as to place all of the convolutions 28 in radial compression. This achieves the advantage of a diaphragm spring rate that can be controlled from slightly positive to slightly negative over the usual working range of deflections, as shown in the curve of FIG. 14.

The rear surface 21a of the moving mirror 21 protrudes through the central aperture of the diaphragm 27, and coupled to this rear surface are three drive coil assemblies 31. Each assembly includes a cylindrical housing 33 firmly attached to the rear surface of the mirror itself, and several turns of electrically conductive wire 35 wrapped about the outer surface of the housing. Each housing accommodates one of three magnetic pole pieces 37 which are extensions of a powerful ceramic magnet assembly 39. The pole pieces fit loosely enough within their respective housings to permit easy longitudinal repositioning within the housing. When current passes through any winding, the electromagnetic field thus induced interacts with the magnetic field of the pole piece and exerts a longitudinal force thereon. The direction and magnitude of the force depend on the polarity and the magnitude, respectively, of the current. The force acts to move the housing along the fixed pole piece, in turn maneuvering the mirror about its diaphragm suspension.

In the absence of any perturbing vibrational effects on the moving mirror 21, a basic drive signal is supplied simultaneously to the three coils, to scan the mirror between a first set of mechanical stops 38, which define its at-rest position, and a second set of stops 40. Typically this is a distance of 0.5 centimeters. When the mirror is set against the first set of stops 38, the moving mirror is aligned so that its reflective surface is perpendicular to the incoming light beam 11a (see FIG. 1). Thus at the start of each scan the movement of the mirror is in a direction perpendicular to its reflective surface. However, in the presence of vibration, different compensating signals must be supplied to each coil, superimposed on the basic drive signal, to maintain the mirror in an untilted orientation, i.e., perpendicular to the incoming beam, as well as to maintain a uniform scanning velocity. The generation of these compensating signals will be described in greater detail hereinafter.

Referring again to FIG. 1, the beam component 11b traveling along the first path illuminates a portion of the planar reflecting surface 41 of the fixed mirror 19, which includes a raised cross-shaped step 43 protruding above the surface. The cross-shaped step also is reflective and has a thickness of $\lambda/8$, $\lambda$ being the wavelength of the He-Ne laser beam ($\lambda = 0.6328$ $\mu$m being a typical wavelength). It should be noted that this monochromatic beam can be transmitted simultaneously with a polychromatic infrared beam which irradiates the sample being analyzed. However, only the monochromatic beam is incident on that portion of the fixed mirror having the step 43.

Figure 4:
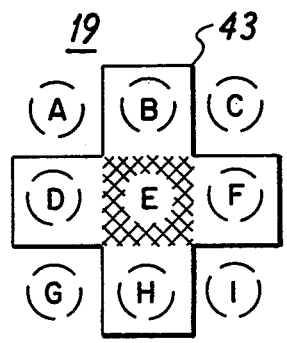
FIG. 4 is a detail view of the λ/8-thick step on the interferometer fixed mirror.

As shown in FIG. 4, the illuminated portion of the fixed mirror 19 can be divided into nine distinct areas, labeled from A to I. Clearly, light impinging on and reflecting from areas B, D, F and H within the cross-shaped section will travel a distance of $\lambda/4$ less than the light incident on areas A, C, G, and I, and so will undergo a phase shift of 90° with respect thereto. Area E has its reflective surface obliterated, and so reflects no light whatsoever, for reasons to be discussed hereinafter. Alternatively the cross-shaped section can be recessed by a distance $\lambda/8$ within the fixed mirror planar surface 41, to effect the same 90° phase shift.

Upon reflection from the respective mirrors, the component beams again pass through the beam splitter/compensator combination 17, are recombined, and are focused by an output optical element 45 onto a detector array 47. The detector array consists of a three-by-three square matrix of nine silicon photodetectors 49, each positioned so as to receive light reflected from a corresponding area of the fixed mirror 19, and each generating an electrical output signal proportional to the intensity of the light incident thereon. Detector A receives light from area A of the fixed mirror, detector B receives light from area B, and so on. Since the reflective surface of area E on the fixed mirror was obliterated, detector E receives only light from the moving mirror 21. Thus, detector E serves to monitor the variations in intensity of the laser source 13.

For the interferometer to render accurate measurements, the moving mirror 21 must be scanned at a constant velocity, with its reflective surface maintained normal to the beam incident thereon. If these conditions are met, then, when the two reflected beams are recombined and focused onto the detector array 47, the optical retardation occurring at detectors B, D, F and H will be exactly 90° out of phase with the optical retardation at detectors A, C, G and I, due to the influence of the cross-shaped step 43. In general, the output signals generated by the non-phase-shifted detectors can be represented by a cosine function, whereas those generated by the phase-shifted detectors can be represented by a sine function (i.e., signals in quadrature) as follows:

$$I_1 = I_1^0 \cos 2\pi\sigma\zeta \text{ (for detectors A, C, G, I)}$$

$$I_1 = I_2^0 \sin 2\pi\sigma\zeta \text{ (for detectors B, D, F, H)}$$

where $\sigma$ = the optical frequency of the laser source in cm$^{-1}$ and $\zeta$ is the optical retardation, which changes over time as the moving mirror is scanned. However, if, because of vibration from the outside environment, the moving mirror 21 is randomly tilted from its desired position, then the optical retardation at certain detectors will contain an additional phase component indicative of the amount of tilt.

Figure 5:
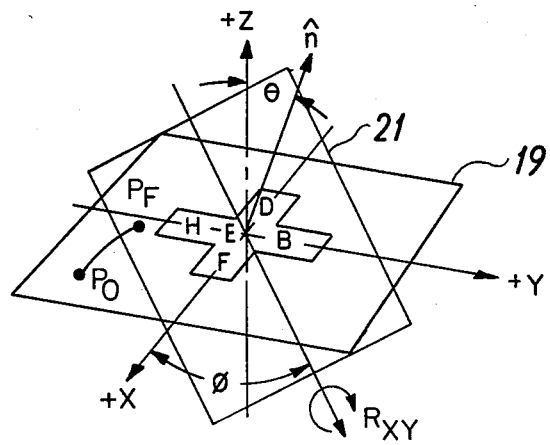
FIG. 5 is a diagram of a mirror coordinate system for defining the deviation coordinates resulting from an arbitrary tilt of the moving mirror.

Referring now to FIG. 5, the effect of an arbitrary tilt of the moving mirror 21 from its static alignment position relative to the fixed mirror 19 can be seen. Here, the fixed mirror 19 is taken to be normal to the Z-axis, with its surface lying in the X, Y plane (i.e., Z=0). The fixed mirror is oriented such that the center area E of the cross-shaped step 43 is located at the origin of the coordinate axes, with areas D and F directly on the X-axis at locations $(-L, 0)$ and $(+L, 0)$ respectively, and areas B and H on the Y-axis at locations $(0, +L)$ and $(0, -L)$ respectively. The moving mirror is tipped by an angle $\theta$ from the Z-axis with the axis of rotation denoted by $R_{XY}$. $R_{XY}$ is at an angle $\phi$ relative to the X-axis. The normal to the tilted moving mirror surface is labeled n. A point in the tilted plane, $P_f = (X_f, Y_f, Z_f)$, may be related through the angles $(\theta, \phi)$ to a point in the untilted $(X, Y)$ plane $P_o = (X_o, Y_o)$. The exact relationship between points $P_f$ and $P_o$ is expressed as:

$$\begin{bmatrix} X_f \\ Y_f \\ Z_f \end{bmatrix} = \begin{bmatrix} \cos^2\phi + \sin^2\phi \cos\theta & \sin\phi \cos\phi(1 - \cos\theta) \\ \sin\phi \cos\phi(1 - \cos\theta) & \sin^2\phi + \cos^2\phi \cos\theta \\ \sin\theta \sin\phi & -\sin\theta \cos\phi \end{bmatrix} \begin{bmatrix} X_o \\ Y_o \end{bmatrix}$$

For the expected range of tilt angles ($\sim$10 sec), $\cos\theta = 1$ and $\sin\theta = \theta$, and so the expression can be simplified to:

$$\begin{bmatrix} X_f \\ Y_f \\ Z_f \end{bmatrix} = \begin{bmatrix} 1 & 0 \\ 0 & 1 \\ \theta\sin\phi & -\theta\cos\phi \end{bmatrix} \begin{bmatrix} X_o \\ Y_o \end{bmatrix}$$

Table 1 gives the untilted coordinates $(X_o, Y_o)$ and the tilted, or deviation, coordinates $(X_f, Y_f, Z_f)$ corresponding to each of the detector positions shown in FIG. 4. It can readily be seen that due to the approximations made, the amount of tilt is reflected by a change in the Z-direction coordinate.

TABLE I

| DETECTOR | $X_o$ | $Y_o$ | $X_f$ | $Y_f$ | $Z_f(\theta,\phi) = \dfrac{\zeta_f(\theta,\phi)}{2}$ | $Z_f(\alpha,\beta) = \dfrac{\zeta_f(\alpha,\beta)}{2}$ |
|---|---|---|---|---|---|---|
| A | −L | L | −L | L | −$\theta$L(sin$\phi$ + cos$\phi$) | −L($\alpha$ + $\beta$) |
| B | O | L | O | L | −$\theta$L(cos$\phi$) | −L($\beta$) |
| C | L | L | L | L | $\theta$L(sin$\phi$ − cos$\phi$) | L($\alpha$ − $\beta$) |
| D | −L | O | −L | O | −$\theta$L(sin$\phi$) | −L($\alpha$) |
| E | O | O | O | O | O | O |
| F | L | O | L | O | $\theta$L(sin$\phi$) | L($\alpha$) |
| G | −L | −L | −L | −L | −$\theta$L(sin$\phi$ − cos$\phi$) | −L($\alpha$ − $\beta$) |
| H | O | −L | O | −L | $\theta$L(cos$\phi$) | L($\beta$) |
| I | L | −L | L | −L | $\theta$L(sin$\phi$ + cos$\phi$) | L($\alpha$ + $\beta$) |

The deviation in the Z-direction of the physical position of the moving mirror 21 can be equated to the change $\Delta\zeta$ in the optical retardation of the light beam reflected from that mirror. If the mirror, in its untilted mode, is assumed to be moving at a velocity v in the Z-direction, then the optical retardation $\zeta$ over time t can be represented by $\zeta=2vt$ (the factor "2" is due to the fact that the beam twice traverses the change in mirror position, i.e., in impinging on, and being reflected from, the mirror). Thus, in the tilted case, the optical retardation at each detector position is the algebraic sum of $\zeta$ plus $\zeta_f$, where $\zeta_f=2Z_f$.

If $\alpha$ is defined as $\alpha=\theta\sin\phi$ and $\beta$ as $\beta=\theta\cos\phi$, then the resulting output signal $I_n$ (in arbitrary units) from the nth detector can be represented as $$I_n(\zeta,\alpha,\beta) = I_n^m + I_n^f + 2\sqrt{I_n^m I_n^f}\cos(\theta_o + \theta_n(\alpha,\beta)) \quad \text{Eq. (1)}$$
for $n = A, C, G, I$ $$I_n(\zeta,\alpha,\beta) = I_n^m + I_n^f + 2\sqrt{I_n^m I_n^f}\sin(\theta_o + \theta_n(\alpha,\beta)) \quad \text{Eq. (2)}$$
for $n = B, D, F, H$ where
$\theta_o = 2\pi\sigma\zeta$
$\theta_n = (2\pi\sigma\zeta_f)_n$ (see Table I)
$\sigma$ = optical frequency of the laser source and
$I_n^m$, $I_n^f$ are the signals reflected from corresponding portions of the moving and fixed mirrors, respectively.

Clearly, Eqs. (1) and (2) are analogous to the quadrature signals discussed earlier with regard to the untilted case, except that the argument of the sine and cosine terms differ (e.g., $\theta_A(\alpha,\beta)\neq\theta_B(\alpha,\beta)$), the difference being related to the magnitude of the tilt.

It should be pointed out that Eqs. (1) and (2) are based on the assumption that the thickness of the $\lambda/8$-thick step is uniform. If this is not the case, then an additional phase term $\psi$ can be entered into the argument of the sine and cosine terms to compensate for the lack of uniformity.

Figure 7:
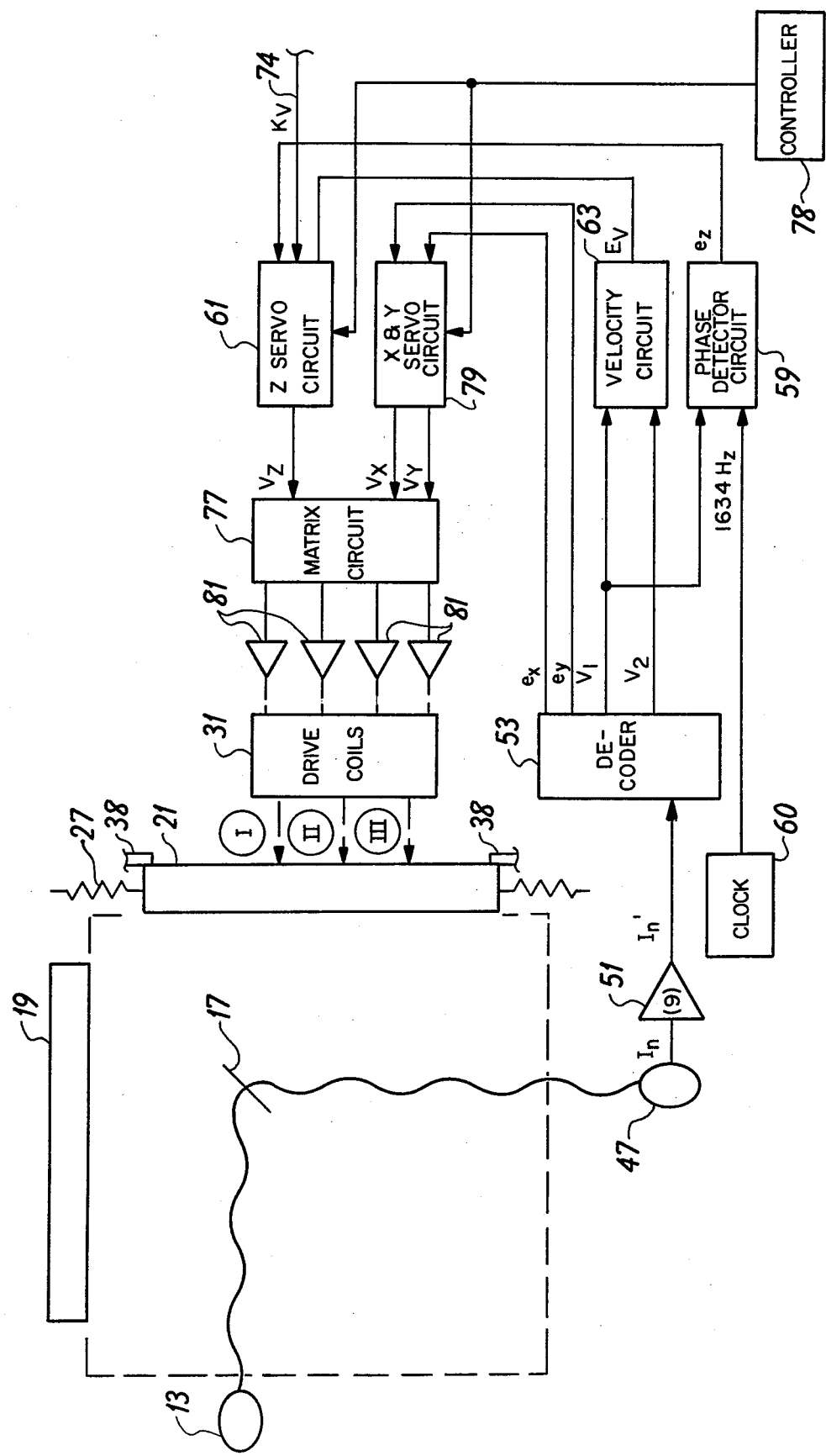
FIG. 7 is a schematic diagram of the control circuitry associated with the embodiment of FIG. 1.

Referring now to FIG. 7, each of the nine output signals $I_n$, usually in the form of d.c. current signals proportional to the intensity of the incident light, is fed to a corresponding pre-amplifier 51. The gain of each pre-amp is slightly different, because of the non-uniformity of the detectors. This yields a series of normalized signals $I_n'$ each having the same minimum and maximum values. Only $I_E'$, the reference signal, is adjusted for a different value, equal to the average value of the $I_n'$ signals.

Figure 8:
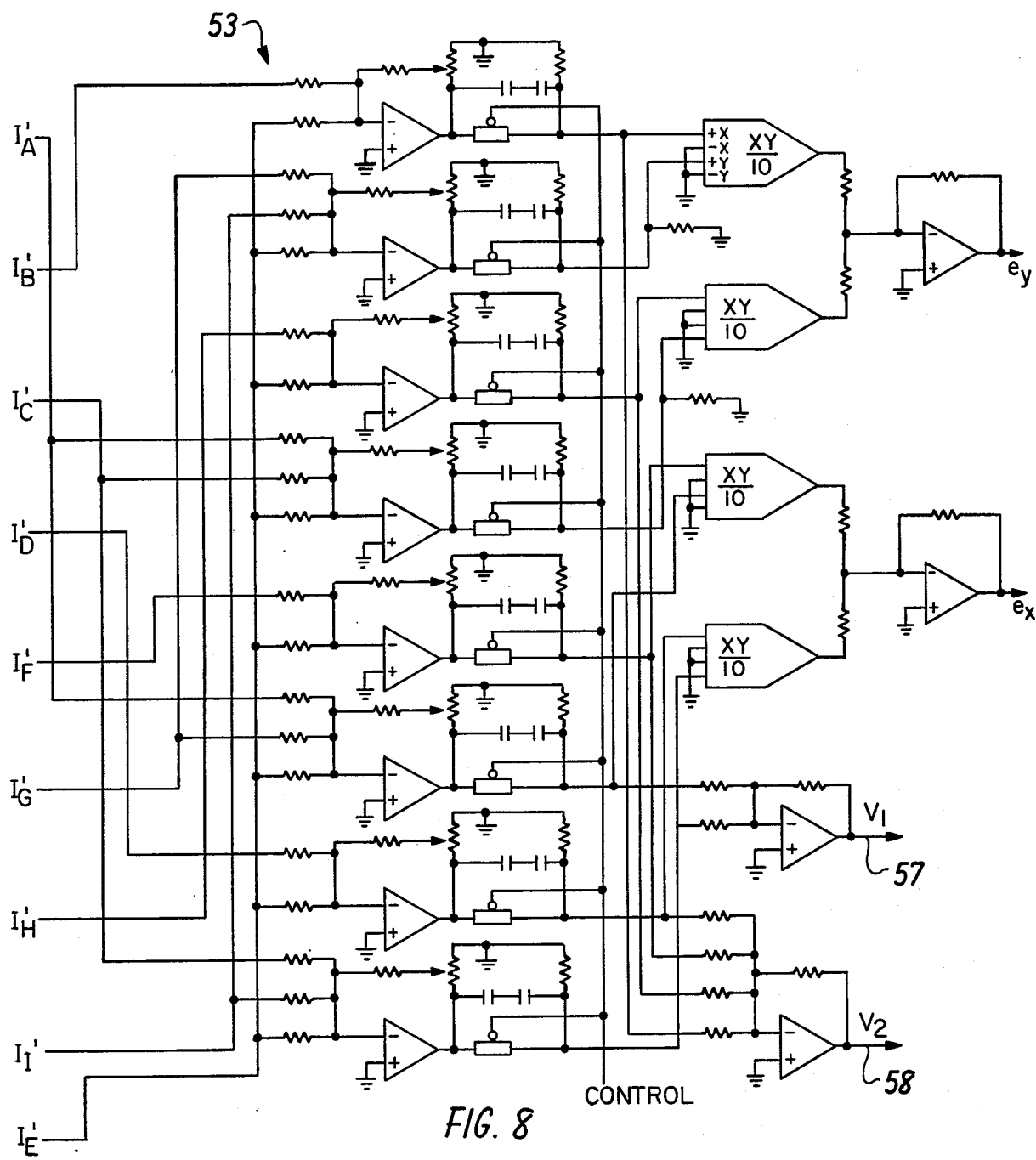
FIG. 8 is a detail schematic of the DECODER block of FIG. 7.

The amplified signals $I_n'$ are entered into a decoder circuit 53 which, as shown in detail in FIG. 8, comprises an assembly of conventional additive and multiplicative components, well known to those skilled in the electronics arts. These components are configured so as to combine the signals $I_n'$ according to the following formulas, to yield error signals $e_X$ and $e_Y$:

$$e_X = \left(\frac{I_A' + I_G'}{2} - KI_E'\right)(I_F' - KI_E') -$$

$$\left(\frac{I_C' + I_I'}{2} - KI_E'\right)(I_D' - KI_E')$$

$$e_Y = \left(\frac{I_A' + I_C'}{2} - KI_E'\right)(I_H' - KI_E') -$$

$$\left(\frac{I_G' + I_I'}{2} - KI_E'\right)(I_B' - KI_E')$$

$e_X$ and $e_Y$ represent the amount of tilt of the moving mirror from its desired orientation in the X- and Y-directions, respectively. The constant factor K adjusts for variations in the intensity of the He-Ne laser, to maintain the input into the decoder circuit 53 from the detector E at a constant level. In this manner, the average value of each quantity within parentheses is 0, because of the appropriate selection of the average values of the $I_n'$ signals and $I_E'$, as discussed above. This adjustment prevents the generation of undesirable harmonics in the error signals, which would cause instability in the servo loop. Using Eqs. (1) and (2) and the values of $\zeta_f(\alpha,\beta)$ in Table I, the expressions for $e_X$ and $e_Y$ can be reduced to:

$$e_X = \sin(8\pi\sigma L\alpha)\cos(4\pi\sigma L\beta)$$

$$e_Y = \sin(8\pi\sigma L\beta)\cos(4\pi\sigma L\alpha)$$

To generate the Z-position and the Z-velocity error signals, to correct for vibration-induced fluctuations in the desired mirror scanning velocity v of the moving mirror 21 (which is assumed to be along the Z axis), two additional quadrature signals $V_1$, $V_2$ are considered.

$V_1$ is the average value of the output signals $I_n'$ from the four cosine detectors (i.e., n=A,C,G,I), while $V_2$ is the average value of the signals $I_n'$ from the four sine detectors (i.e., n=B,D,F,H). As can be readily seen in FIG. 8, the two values $V_1$, $V_2$ are achieved within the decoder circuit 53, with the resultant signals $V_1$ and $V_2$ appearing on output lines 57, 58 respectively.

Referring again to FIG. 7, the Z-position error signal is developed by multiplying the cosine term $V_1$, within a phase detector circuit 59, by a signal from a constant frequency clock 60. The phase detector circuit can be any one of a variety of conventional circuits of this type, as known to those skilled in the electronics arts. The temporal frequency $f_r$ of the clock signal corresponds to the frequency $\sigma$ of tHe-Ne visible light source, i.e., $f_r = 2v\sigma$. The value of $f_r$ used in the illustrated embodiment is 1634 Hz. It should be noted that $f_r$ is actually the frequency of the interference fringes developed from the visible light source 13 by the moving mirror 21, if it is moving at the desired velocity v. By passing the product of these two signals through a filter (not shown) that does not pass frequencies greater than $f_r$, then only a signal having a difference frequency $\Delta f = f_z - f_r$ remains, where $f_z = 2v_z\sigma$ and $v_z$ is the instantaneous velocity. For small differences in position, the Z-position error signal $e_z$, appearing at the output of the phase detector circuit, can be expressed as:

$$E_z = (\text{constant})(2\pi t \Delta f)$$

This signal $e_z$ forms one input to a mirror drive Z-servo circuit 61 to be discussed in greater detail hereinafter.

Figure 9:
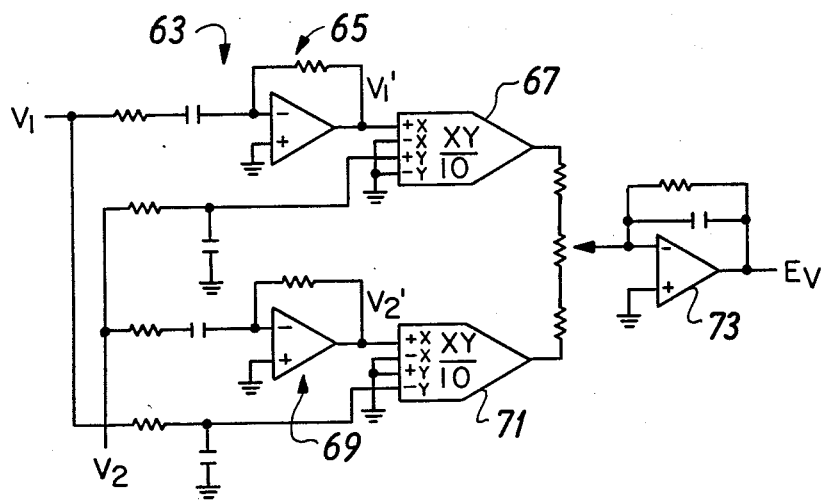
FIG. 9 is a detail schematic of the VELOCITY CIRCUIT block of FIG. 7.

While the Z-position error signal $e_z$ is being developed, a Z-velocity measurement signal $E_v$ also is being generated from the $V_1$ and $V_2$ quadrature signals. Referring again to FIG. 7, the cosine signal $V_1$ and the sine signal $V_2$ are introduced into a velocity circuit 63. As shown in more detail in FIG. 9, the $V_1$ signal is processed through a differentiator 65, and the differentiated signal $V_1'$ is multiplied by the $V_2$ signal within a multiplier 67. Similarly, the $V_2$ signal is fed through a differentiator 69 and the resulting $V_2'$ is multiplied by the $V_1$ signal within a multiplier 71. The respective outputs of the multipliers are then subtracted by the operation of an operational amplifier 73 to yield the quantity $$E_v = V_1 V_2' - V_1' V_2$$

which can be shown to be reducible to the basic form $$E_v = (\text{constant})v$$

i.e., linearly dependent on the instantaneous mirror velocity v. $E_v$ forms a second input into the mirror drive Z-servo circuit 61 (see FIG. 7).

Figure 10:
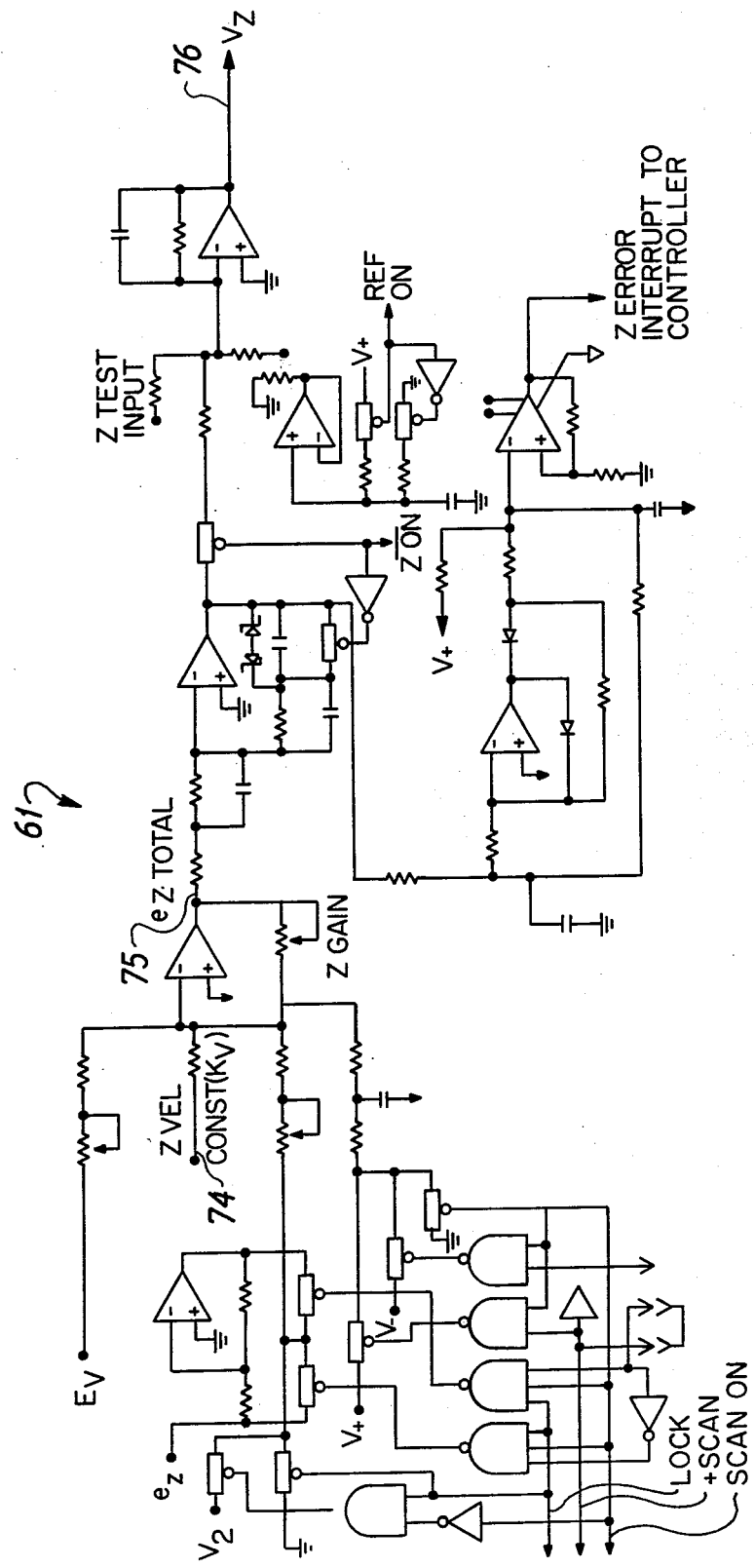
FIG. 10 is a detail schematic of the Z-SERVO CIRCUIT BLOCK of FIG. 7.

In addition to the $e_z$ and $E_v$ signals, the mirror drive Z-servo circuit 61 receives via line 74 (see also FIG. 10) a constant input voltage signal $K_v$ which corresponds to the desired mirror velocity v. Thus, the Z-servo circuit, shown in detail in FIG. 10, which also is a conventional circuit well known to those skilled in the electronics art, is able to derive from these inputs a velocity error signal $e_v = E_v - K_v$. Subsequently, the Z-servo circuit generates a signal $e_{z\ total}$ on line 75, which incorporates both the Z-position error signal $e_z$ and the Z-velocity error signal $e_v$.

Figure 11:
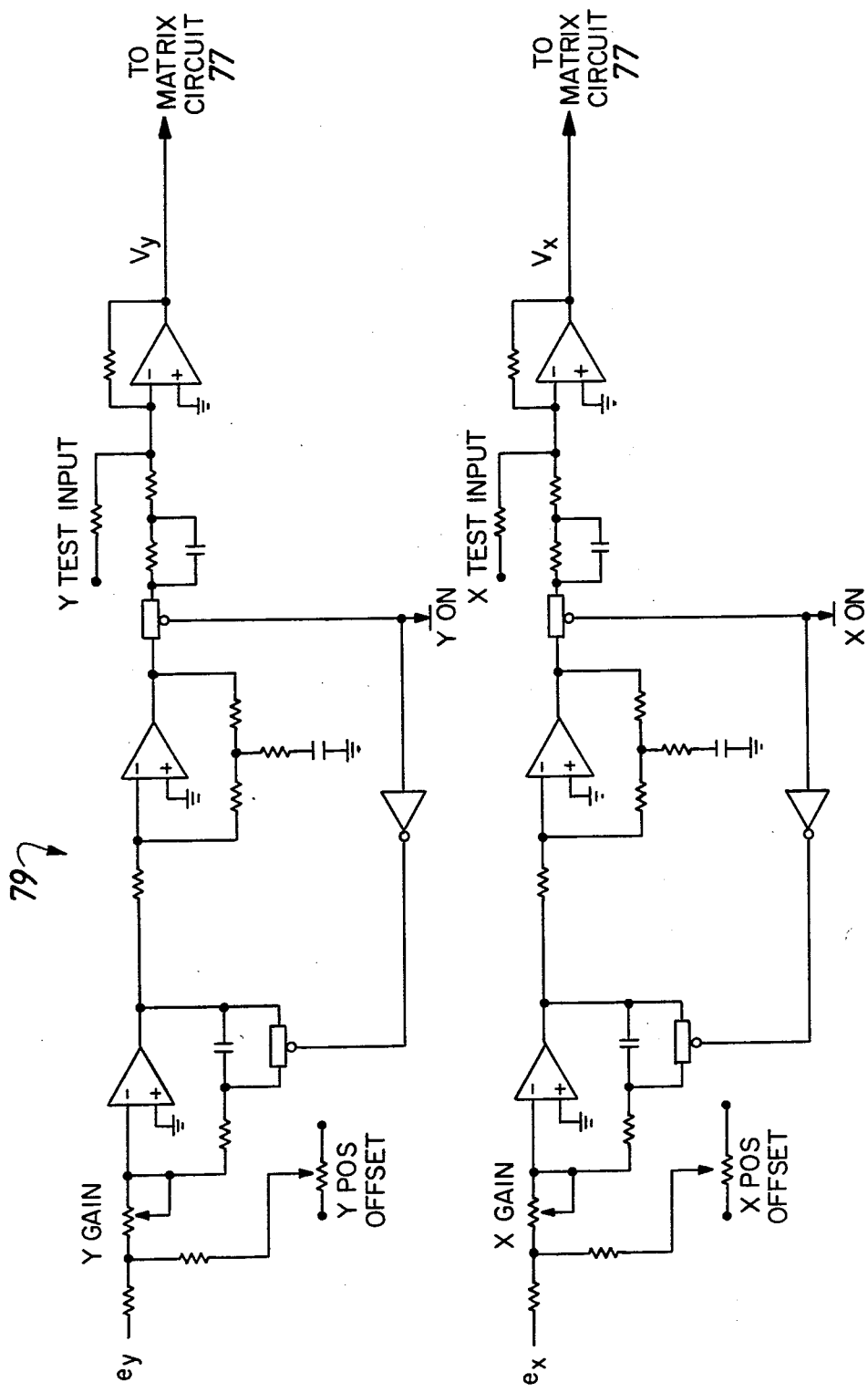
FIG. 11 is a detail schematic of the X and Y-SERVO CIRCUIT block of FIG. 7.

The Z-servo circuit 61 also performs frequency compensation on the $e_{z\ TOTAL}$ signal, so that the appropriate phase criteria are met to ensure stabillity of the servo loop. Finally, the circuit feeds a voltage signal $V_z$, containing the combined Z-position and Z-velocity error information, along a line 76 to a matrix circuit 77. Similarly, an X and Y-servo circuit 79, shown in greater detail in FIG. 11, processes and frequency compensates the $e_X$ and $e_Y$ signals to yield voltage signals $V_X$ and $V_Y$ respectively, and in turn supplies these voltage signals to the matrix circuit.

Figure 6:
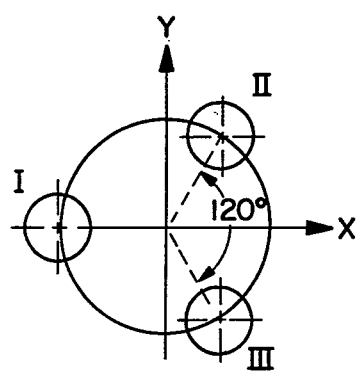
FIG. 6 is a diagram showing the geometry of the voice coils of FIG. 2 relative to the X and Y axes.
Figure 12:
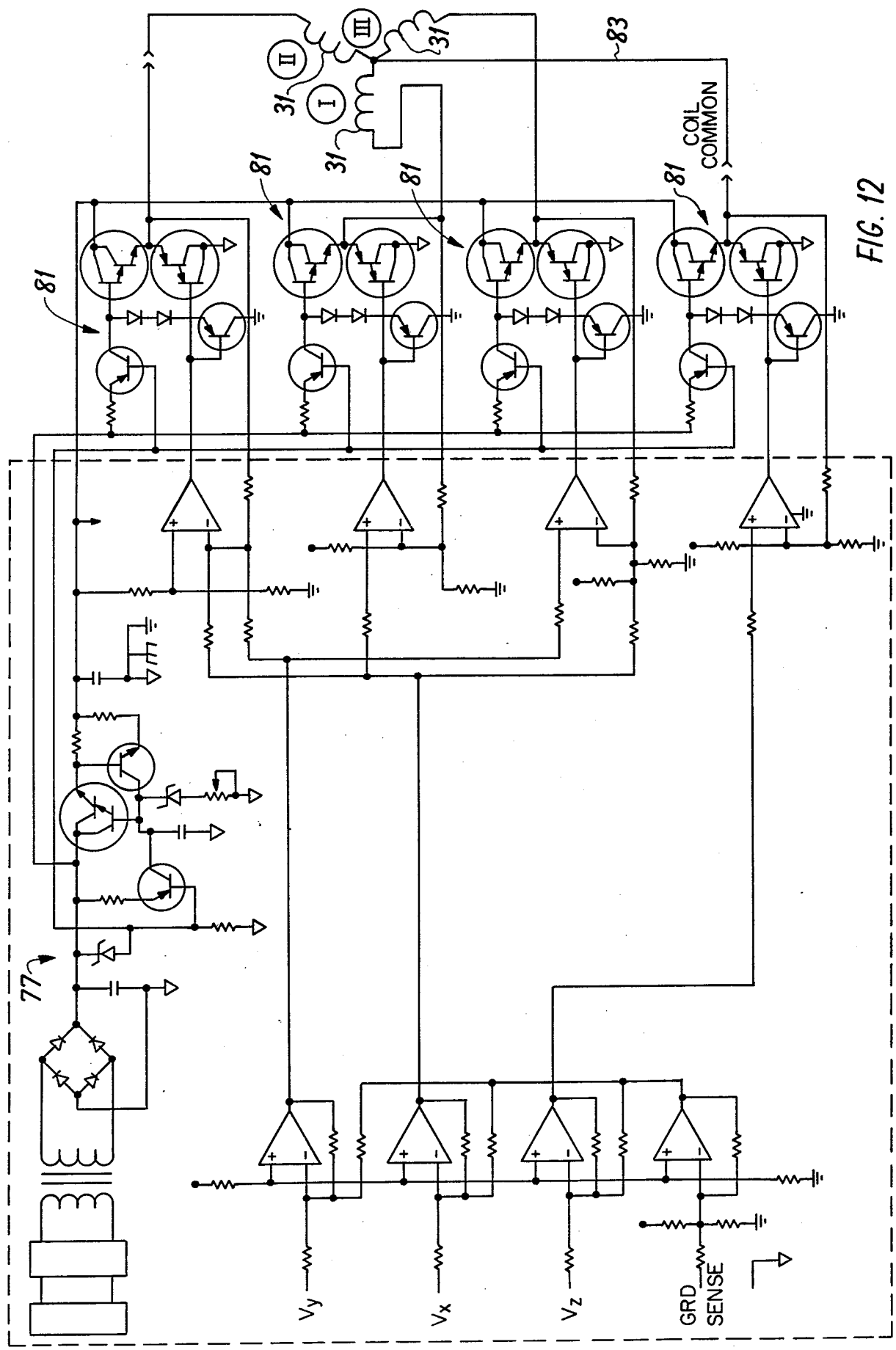
FIG. 12 is a detail schematic of the MATRIX CIRCUIT block of FIG. 7.

Referring again to FIG. 7, the matrix circuit 77 (see also FIG. 12), in combination with four power amplifiers 81, reconfigures and scales the three signals $V_X$, $V_Y$ and $V_Z$ into a form which achieves the desired reorientation of the moving mirror 21, given the particular arrangement of the drive coils 31. The scaling operation ensures that a signal of a given magnitude produces the same amount of torque whether applied in the X-direction or the Y-direction. Referring now to FIG. 6, the three coils, identified as coils I, II and III, are spaced in a circular pattern, at 120° intervals. Assuming that the mirror in its untilted orientation is lying entirely in the X-Y plane, coil I is located directly on the X-axis, and coils II and III are at 60° on either side of that axis. Four voltage signals are applied to the drive coils via the four preamplifiers 81, to produce an actuating current within each coil. The first signal, $V_Z$, is supplied commonly to all three coils via a line 83, to effect the basic scanning motion of the mirror at the appropriate velocity. In addition, the following three signals also are supplied individually to coils I, II, and III, superimposed on $V_Z$, to apply the necessary tilt corrections:

$$\text{I:} \quad -V_X$$
$$\text{II:} \quad \frac{V_X}{2} + V_Y$$
$$\text{III:} \quad \frac{V_X}{2} - V_Y$$

It should be noted that both servo circuits 61 and 79 (see FIG. 7) also receive input signals from a controller 78. The controller, which can be a microprocessor or any of a variety of similarly functioning devices, coordinates the overall operation of the drive system. For example, the controller initiates the motion of the moving mirror 21 to start a scanning cycle. At the start of a scan, the controller causes the moving mirror to be pulled back against the mechanical stops 38 in order to give a rough alignment, so that the drive system can achieve an initial lock. Also, since the drive system has a limited dynamic range, on the order of a few arc seconds of tilt, any tilt beyond this range causes the servo circuits 61, 79 to lose lock. In this situation the controller receives from the Z-servo circuit 61 a "Z ERROR INTERRUPT" signal (see FIG. 10), and in turn returns the moving mirror to its reference point against the mechanical stop, before initiating a new scan. Also, the controller is used to keep track of where the mirror is in relation to its overall range of movement, to permit scanning in the reverse direction once the end point has been reached. However, the functioning of this controller is peripheral to the novel aspects of the present invention, and as such will not be dealt with in any further detail herein.

Figure 13:
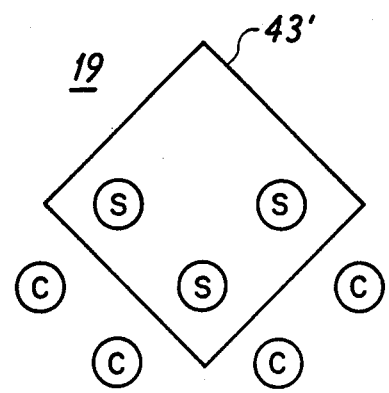
FIG. 13 is a detail view of an alternate configuration of the λ/8-thick step of FIG. 4.
Figure 2:
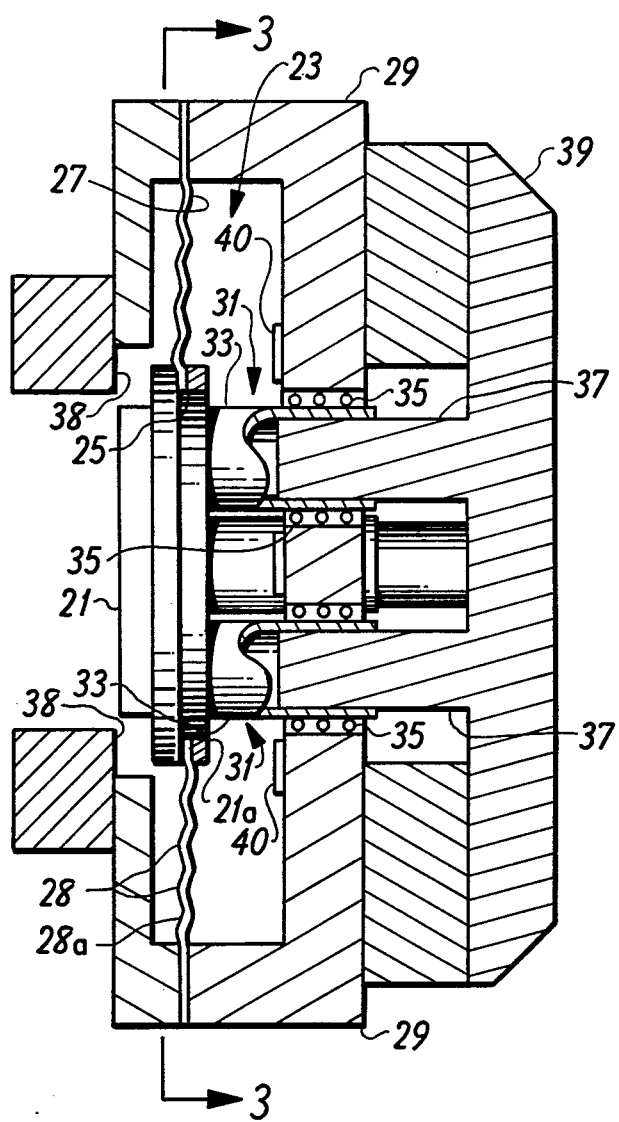
FIG. 2 is a detail view, partially in section, of the diaphragm and drive coil transport mechanism used for scanning the moving mirror.

It should be mentioned that alternate configurations of the $\lambda/8$-thick step 43 and to the photodetector array 47, are usable in the present invention, an example of which is shown in FIG. 13. Here a step 43' encompasses three areas labeled S, while the adjacent surface of the fixed mirror 19 encompasses four distinct areas labeled C. Light reflecting from the three areas S is phase-shifted by 90° relative to that reflected from the areas C, accounting for the sine and cosine signals respectively. Clearly the use of this alternate configuration requires a corresponding modification to the mathematical equations describing the signals generated thereby.

The interferometer drive system in accordance with the present invention offers several advantages over prior art systems. In many prior art systems velocity and position fluctuations were detected by observing changes in the times of the zero crossings of the interference fringes. However this technique puts an upper limit on the frequency at which updated information is provided to the mirror drive servo. In other words, the servo is unable to correct for vibrations above a certain frequency. For example, assume that the moving mirror is to be scanned so as to produce 1630 fringes per second. Since data sampling at the fringe zero crossings means that only two samplings occur per cycle, then, according to the Nyquist criterion, the servo system cannot respond to a signal having a frequency greater than 1630 Hz. Accordingly, the effective servo bandwidth would be only one-third to one-half of the 1630 Hz, severely limiting its vibration-compensating ability. With the present invention, however, essentially continuous sampling of the X and Y positional data and Z-velocity data is available, thereby achieving greater servo bandwidth which allows the drive system to respond to higher frequency perturbations.

The provision of continuous data allows the use of a relatively simple mechanical suspension for the moving mirror. Mechanical complexity is replaced by electronic circuitry, which provides greater accuracy and reliability at a lower cost. Also, the large number of photodetectors 49 and the nature of the phase difference signals generated thereby are instrumental in ensuring that the moving mirror 21 remains under servo control even when the mirror is stationary, and at the time of scan reversal.

Although the present invention has been described in terms of a preferred embodiment, as shown in the accompanying figures, certain modifications and changes may become apparent to those skilled in the art. For example, the phase-shift producing step can be located on the moving mirror 21 instead of the fixed mirror 19, and can be configured in many different ways, with corresponding changes in the photodetector array 47. Certain advantages may be achieved by locating the step not at the center of the mirror, but offset therefrom. Also, the thickness of the step can be other than $\lambda/8$, in which case the phase-shifted and non-phase shifted signals would stand in a non-quadrature relationship. Nevertheless, it is intended that such modifications be encompassed within the scope of the following appended claims.

What is claimed is:

1. In an interferometer in which a first light beam derived from a monochromatic source is incident on a fixed mirror and a second light beam derived from the same monochromatic source is incident on a moving mirror, wherein said moving mirror is to be moved both at a constant rate and at a constant angular tilt relative to the direction of incidence of said second beam on its reflective surface, and wherein said first and second light beams are recombined after reflection from their respective mirrors, an improved mirror drive control system, comprising:
    drive means for both moving said moving mirror and for adjusting the angular tilt thereof;
    means for deriving from the recombined light beams both a first set of error signals indicating deviations in the rate of movement of said moving mirror from said constant rate and a second set of error signals indicating deviations in the angular tilt of said moving mirror from said constant angular tilt; and
    servo means for receiving said first and second sets of error signals and providing corresponding control signals to said drive means to correct for said deviations.

2. The mirror drive control system as set forth in claim 1, wherein said drive means moves said moving mirror in a direction so as to maintain its reflective surface perpendicular to said incident second light beam.

3. The mirror drive control system as set forth in claim 1, further comprising:
    means for introducing a phase shift into a portion of one of said first and second light beams, and wherein said means for deriving includes means for generating multiphase signals incorporating phase shift data extracted from said recombined light beams, said data being indicative of the rate of movement and the angular tilt of said moving mirror.

4. The mirror drive control system as set forth in claim 3, wherein said phase shift is 90°.

5. The mirror drive control system as set forth in claim 3, wherein said means for introducing a phase shift comprises a reflective element having a thickness which is a predetermined fraction of the wavelength of said monochromatic source, said element being on the reflective surface of one of said mirrors, disposed so that both said element and the adjacent areas of said reflective surface are illuminated by the light beam incident on said one of said mirrors.

6. The mirror drive control system as set forth in claim 4 wherein said means for introducing a 90° phase shift comprises a reflective element having a thickness which is one-eighth the wavelength of said monochromatic source, said element being on the reflective surface of one of said mirrors, disposed so that both said element and the adjacent areas of said reflective surface are illuminated by the light beam incident on said one of said mirrors.

7. The mirror drive control system as set forth in claim 6, wherein said reflective element is located on said fixed mirror.

8. The mirror drive control system as set forth in claim 7, wherein said reflective element is cross-shaped.

9. The mirror drive control system as set forth in claim 1, wherein said drive means comprises:
    a flexible diaphragm supporting said moving mirror for movement thereof; and
    a plurality of actuators coupled between said moving mirror and a fixed location on said interferometer for selectively exerting force against said mirror to effect movement of said mirror about said diaphragm.

10. The mirror drive control system as set forth in claim 9 wherein said flexible diaphragm includes a plurality of concentric circumferential convolutions formed in its surface, the outermost of said convolutions being flattened so as to place the remaining convolutions in radial compression; and a plurality of radially extending slits cut into said surface, whereby the compliance of said diaphragm in an axial direction is enhanced.

11. The mirror drive control system as set forth in claim 9, wherein each of said actuators comprises:
    a magnetic member attached to said fixed location on said interferometer; and
    an electrical coil assembly attached to said moving mirror and loosely surrounding said magnetic member, and receiving said control signals from said servo means, whereby the interaction between the magnetic field of said magnetic member and the magnetic field of each coil assembly, as induced by the application of said control signals thereto, effects movement of said coil assembly relative to said fixed magnetic member.

12. The mirror drive control system as set forth in claim 11, wherein said coil assemblies are arranged in a circular configuration on said moving mirror at equiangular spacings.

13. The mirror drive control system as set forth in claim 5, wherein said means for generating multiphase signals comprises:
a plurality of optical detectors disposed so that each of a first group of detectors receives light reflected from a corresponding location on said reflective element and each of a second group of detectors receives light reflected from said adjacent areas of said reflective surface.

14. In an interferometer of the type in which a first light beam derived from a monochromatic source is incident on a fixed mirror and a second light beam derived from the same monochromatic source is incident on a moving mirror, wherein said moving mirror is to be moved both at a constant rate and at a constant angular tilt relative to the direction of incidence of said second beam on its reflective surface, and wherein said first and second light beams are recombined after reflection from their respective mirrors, the apparatus comprising:
means for deriving from the recombined light beams both a first set of error signals indicating deviations in the rate of movement of said moving mirror from said constant rate and a second set of error signals indicating deviations in the angular tilt of said moving mirror from said constant angular tilt.

15. The apparatus as set forth in claim 14, further comprising:
means for introducing a phase shift into a portion of one of said first and second light beams, and wherein said means for deriving includes means for generating multiphase signals incorporating phase shift data extracted from said recombined light beams, said data being indicative of the rate of movement and the angular tilt of said moving mirror.

16. The apparatus as set forth in claim 15 wherein said phase shift is 90°.

17. In an interferometer of the type in which a first light beam derived from a monochromatic source is incident on a fixed mirror and a second light beam derived from the same monochromatic source is incident on a moving mirror, wherein said moving mirror is to be moved both at a constant rate and at a constant angular tilt relative to the direction of incidence of said second beam on its reflective surface, and wherein said first and second light beams are recombined after reflection from their respective mirrors, the apparatus comprising:
means for introducing a 90° phase shift into a portion of one of said first and second light beams;
means for generating quadrature signals incorporating phase shift data extracted from the recombined light beams, said data being indicative of the rate of movement and the angular tilt of said moving mirror; and
means for deriving from said quadrature signals both a first set of error signals indicating deviations in the rate of movement of said moving mirror from said constant rate and a second set of error signals indicating deviations in the angular tilt of said moving mirror from said constant angular tilt.

18. The apparatus as set forth in claim 17, wherein said means for introducing a 90° phase shift comprises a reflective element having a thickness of one-eighth the wavelength of said monochromatic source, said element being on the reflective surface of said fixed mirror, disposed so that both said element and the adjacent areas of said reflective surface of said fixed mirror are illuminated by said first light beam.

19. The apparatus as set forth in claim 18, wherein said means for generating quadrature signals comprises:
a plurality of optical detectors disposed so that each of a first group of detectors receives light reflected from a corresponding location on said reflective element and each of a second group of detectors receives light reflected from said adjacent areas of said fixed mirror.

* * * * *